April 29, 1941.    H. T. KINNEY    2,239,820
CLIP FOR SCREW DRIVERS
Filed June 21, 1939
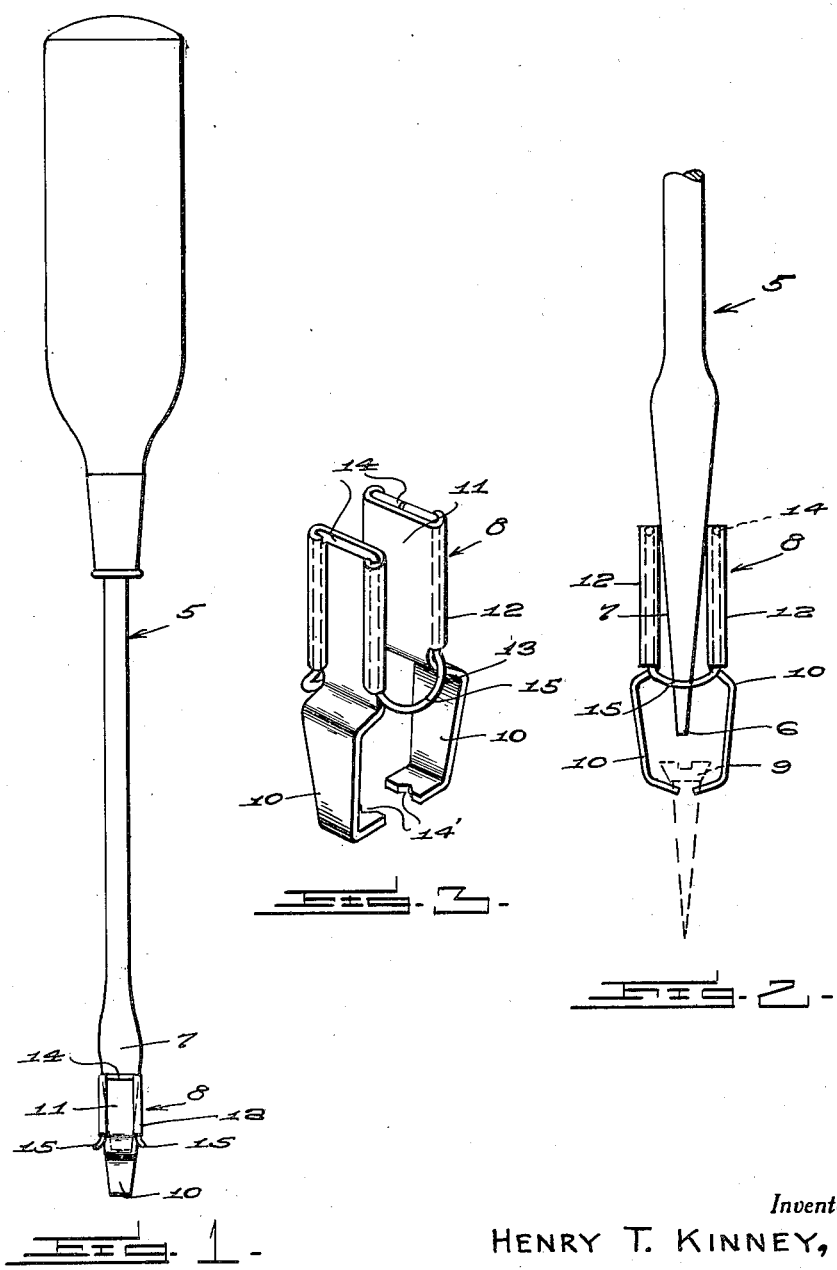
Inventor
HENRY T. KINNEY,
By Clarence A. O'Brien
and Hyman Berman
Attorneys Patented Apr. 29, 1941

2,239,820

UNITED STATES PATENT OFFICE 2,239,820

CLIP FOR SCREW DRIVERS

Henry T. Kinney, Hicksville, N. Y.

Application June 21, 1939, Serial No. 280,399

1 Claim. (Cl. 145—52)

This invention relates to clips for screw drivers, and has for the primary object the provision of a device of this character which may be readily adapted to a standard type screw driver for detachably securing a screw, screw type bolt or similar fastener on the screw driver to permit the fastener to be easily threaded home into a device without the necessity of holding the fastener when starting the threading thereof into said device and which may be easily and quickly removed from the screw driver when not needed.

With these and other objects in view, the invention consists in certain novel features of construction, combination and arrangement of parts to be hereinafter more fully described and claimed.

For a complete understanding of my invention, reference is to be had to the following description and accompanying drawing, in which—

Figure 1 is a side elevation illustrating a screw driver equipped with a clip constructed in accordance with my invention.

Figure 2 is a fragmentary edge elevation illustrating the application of the clip to the screw driver and showing the clip gripping a screw or like fastener for positioning the kerfed end thereof opposite the work engaging end of the screw driver.

Figure 3 is a perspective view illustrating the clip.

Referring in detail to the drawing, the numeral 5 indicates a screw driver of a conventional construction, the work engaging end being indicated by the character 6 and including the usual oppositely arranged tapering flat faces 7.

The present invention consisting of a jaw type clip indicated by the character 8 may be readily adapted to the flat faces 7 of the screw driver with the jaw portions projecting beyond the work engaging end to receive and grip a screw or like fastener indicated by the character 9.

The clip 8 includes companion jaws 10 and plate-like portions 11 arranged in opposed relation and having opposite edges thereof rolled to form barrels 12. A spring member 13 extends through the barrel-like portions for yieldably connecting the plate-like portions of the jaws together and which normally urges the plate-like portions toward each other for the purpose of gripping the opposed flat faces 7 of the screw driver for retaining the clip on said screw driver with the jaws arranged beyond the work-engaging end 6 of the screw driver so as to receive in the notched portions 14' thereof the screw or like fastener and which align the kerf of said fastener with the work engaging end of the screw driver whereby with a pressure placed on the screw driver and the fastener in engagement with a device the end 6 moves into the kerf so that the fastener may be threaded into said device without being held in the fingers of the operator.

The spring member 13 is constructed from a single length of resilient material which is bent upon itself to form a pair of substantially U-shaped portions 14, portions of which extend through the barrels 12 of the plate-like portions and connecting portions 15 which join the substantially U-shaped portions together. The jaws 10 of the clip 8 have portions thereof offset slightly from the plate-like portions 11 so that the head of the screw can be readily received therebetween while the gripping ends of the jaws are arranged in substantially opposed relation to grip the screw under the head thereof, as shown in Figure 2.

It will be seen the further the plate-like portions are moved onto the tapered faces 7 of the screw driver the more the jaws 10 will be forced in the direction of each other and consequently bring about an effective gripping of the screw or similar fastener. Further, it will be seen that the construction shown and described in detail will permit easy and quick application and removal of the clip both to the fastener as well as to the screw driver.

It is believed that the foregoing description, when taken in connection with the drawing will fully set forth the construction and advantages of this invention to those skilled in the art to which such a device relates, so that further detailed description will not be required.

Having described the invention, I claim:

In a device of the character described, spaced elongated plates arranged to engage opposite faces of a shank of a screw driver, barrels formed on edges of the plates and substantially paralleling the axis of the shank of the screw driver, jaws integral with companion ends of the plates and including opposed gripping ends, and a spring member of substantially U shaped including pairs of arm portions entering said barrels, and a pair of bowed tension creating connecting portions acting to urge the plates and jaws into gripping position.

HENRY T. KINNEY.